United States Patent
Harata et al.

(10) Patent No.: US 12,516,294 B2
(45) Date of Patent: Jan. 6, 2026

(54) METHOD FOR PRODUCING MESENCHYMAL STEM CELLS FROM LIVING BODY-DERIVED CELL SAMPLE CONTAINING MESENCHYMAL STEM CELLS

(71) Applicant: AJINOMOTO CO., INC., Tokyo (JP)

(72) Inventors: Ikue Harata, Kawasaki (JP); Eri Harada, Kawasaki (JP); Kazuma Takahashi, Kawasaki (JP); Fumie Honkawa, Kawasaki (JP)

(73) Assignee: AJINOMOTO CO., INC., Tokyo (JP)

(*) Notice: Subject to any disclaimer, the term of this patent is extended or adjusted under 35 U.S.C. 154(b) by 897 days.

(21) Appl. No.: 17/680,619

(22) Filed: Feb. 25, 2022

(65) Prior Publication Data
US 2022/0177848 A1    Jun. 9, 2022

Related U.S. Application Data

(63) Continuation of application No. PCT/JP2020/032514, filed on Aug. 28, 2020.

(30) Foreign Application Priority Data

Aug. 29, 2019 (JP) ................. 2019-156537
Jan. 29, 2020 (JP) ................. 2020-012333

(51) Int. Cl.
  C12N 5/0775   (2010.01)
  C12N 5/00     (2006.01)

(52) U.S. Cl.
  CPC ......... C12N 5/0663 (2013.01); C12N 5/0081 (2013.01); C12N 5/0667 (2013.01); C12N 2500/90 (2013.01); C12N 2500/98 (2013.01); C12N 2501/15 (2013.01); C12N 2533/50 (2013.01); C12N 2533/90 (2013.01)

(58) Field of Classification Search
None
See application file for complete search history.

(56) References Cited

U.S. PATENT DOCUMENTS

| | | |
|---|---|---|
| 2005/0019865 A1 | 1/2005 | Kihm et al. |
| 2010/0047214 A1 | 2/2010 | Abramson et al. |
| 2012/0301962 A1 | 11/2012 | Thomson et al. |
| 2012/0329087 A1 | 12/2012 | Tsuchiya et al. |
| 2015/0368610 A1 | 12/2015 | Thomson et al. |
| 2016/0272945 A1 | 9/2016 | Hagiya et al. |
| 2017/0044489 A1 | 2/2017 | Barry et al. |
| 2018/0362933 A1 | 12/2018 | Tahara et al. |

FOREIGN PATENT DOCUMENTS

| | | |
|---|---|---|
| CN | 108517313 A | 9/2018 |
| JP | 2007-528702 A | 10/2007 |
| JP | 2012-500792 A | 1/2012 |
| WO | WO 2011/111787 A1 | 9/2011 |
| WO | WO 2015/064661 A1 | 5/2015 |
| WO | 2017-506511 A | 3/2017 |
| WO | WO 2017/094879 A1 | 6/2017 |

OTHER PUBLICATIONS

Varun et al. "A robust vitronectin-derived peptide for the scalable long-term expansion and neuronal differentiation of human pluripotent stem cell (hPSC)-derived neural progenitor cells (hNPCs)" 2017, Acta Biomaterialia, vol. 48: 120-130. (Year: 2017).*
Wheaton et al. "The vitronectin RGD motif regulates TGF-B-induced alveolar epithelial cell apoptosis" 2016, Am J Phsio Lung Cell Molecul Physiol, 310: L1206-1217. (Year: 2016).*
International Search Report issued Oct. 13, 2020 in PCT/JP2020/032514, 3 pages.
Extended European Search Report issued Aug. 9, 2023 in European Patent Application No. 20859384.8. 9 pgs.
Parker Tony et al: "Vitronectin Modulates Human Mesenchymal Stem Cell Response to Insulin-like Growth Factor-I and Transforming Growth Factor Beta 1 in a Serum-free Environment", Tissue Engineering Part A, vol. 15, No. 6, Jun. 1, 2009 (Jun. 1, 2009), pp. 1415-1426.
Salasznyk Roman M. et al: "Adhesion to Vitronectin and Collagen I Promotes Osteogenic. Differentiation of Human Mesenchymal Stem Cells", Journal of Biomedicine and Biotechnology, vol. 2004, No. 1, Jan. 1, 2004 (Jan. 1, 2004), pp. 24-34.
Kundu Anup K et al: "Vitronectin and collagen I differentially regulate osteogenesis in mesenchymal stem cells", Biochemical and Biophysical Research Communications, Elsevier, Amsterdam NL, vol. 347, No. 1, Aug. 18, 2006 (Aug. 18, 2006), pp. 347-357.

* cited by examiner

Primary Examiner — Teresa E Knight
(74) Attorney, Agent, or Firm — Oblon, McClelland, Maier & Neustadt, L.L.P.

(57) ABSTRACT

Mesenchymal stem cells may be efficiently obtained from a biological cell sample containing mesenchymal stem cells by:
 (1) culturing the biological cell sample containing mesenchymal stem cells in a serum-free medium in the presence of vitronectin or a partial peptide thereof capable of adhering mesenchymal stem cells, and
 (2) collecting a cell aggregate of the mesenchymal stem cells.

21 Claims, 5 Drawing Sheets
Specification includes a Sequence Listing.

METHOD FOR PRODUCING MESENCHYMAL STEM CELLS FROM LIVING BODY-DERIVED CELL SAMPLE CONTAINING MESENCHYMAL STEM CELLS

CROSS REFERENCES TO RELATED APPLICATIONS

This application is a continuation of International Patent Application No. PCT/JP2020/032514, filed on Aug. 28, 2020, and claims priority to Japanese Patent Application No. 2019-156537, filed on Aug. 29, 2019, and Japanese Patent Application No. 2020-012333, filed on Jan. 29, 2020, all of which are incorporated herein by reference in their entireties.

BACKGROUND OF THE INVENTION

Field of the Invention

The present invention relates to methods for producing a mesenchymal stem cell from a biological cell sample containing mesenchymal stem cells.

Discussion of the Background

In recent years, the development of pharmaceutical products using biological cells or tissues and the research on regenerative medicine have progressed and are attracting attention. Of these, research using embryonic stem cells and induced pluripotent stem cells provided with pluripotency as organ regeneration technique or drug discovery screening tool is accelerating. However, the production of embryonic stem cells requires the destruction of embryos developed from fertilized eggs, which poses an ethical problem. Induced pluripotent stem cells are obtained by reprogramming somatic cells, and the above-mentioned problems do not occur. However, there is a concern that cancer cells may be generated from induced pluripotent stem cells due to the use of c-myc as a reprogramming factor, random gene transfer into chromosomes by a retrovirus vector, undifferentiated cells remaining after differentiation, and the like. On the other hand, mesenchymal stem cells have pluripotency permitting differentiation into not only multiple cells of mesenchymal lineage (osteoblast, adipocyte, chondrocyte) but also cells of non-mesenchymal lineage (neural progenitor cell, hepatocyte), and are free of problems caused by embryonic stem cells or induced pluripotent stem cells. Thus, they are expected to be used as a cell source for regenerative medicine and cell therapy.

Mesenchymal stem cells can be produced not only from tissues of adults such as bone marrow, fat, synovial membrane, alveolar bone, periodontal ligament, and the like but also from various tissues such as placenta, umbilical cord blood, and umbilical cord, and can be cultured and amplified in vitro. As a conventional method for obtaining mesenchymal stem cells, since bone marrow mononuclear cells produced from bone marrow contain a small amount of mesenchymal stem cells, the mesenchymal stem cells were produced by culturing bone marrow mononuclear cells produced from bone marrow in a medium containing bovine fetal serum (FBS), and utilizing the adhesiveness of the mesenchymal stem cells to a culture container. However, when mesenchymal stem cells are used as a cell source for regenerative medicine, contamination of the mesenchymal stem cells with xenogeneic components was inconvenient.

Therefore, a method for culturing mesenchymal stem cells using a serum-free medium has been devised (see WO 2011/111787, which is incorporated herein by reference in its entirety). However, in order to achieve proliferation of mesenchymal stem cells, it is necessary to produce mesenchymal stem cells from bone marrow mononuclear cells containing mesenchymal stem cells, and a method for efficiently producing mesenchymal stem cells from bone marrow mononuclear cells containing mesenchymal stem cells by using a serum-free medium has not yet been developed.

SUMMARY OF THE INVENTION

Accordingly, it is an object of the present invention to provide a method for efficiently producing a mesenchymal stem cell from a biological cell sample containing mesenchymal stem cells.

This and other objects, which will become apparent during the following detailed description, have been achieved by the inventors' succeeding in producing cell aggregates formed by mesenchymal stem cells adhered to a culture container via vitronectin, by culturing bone marrow mononuclear cells containing mesenchymal stem cells in a serum-free medium on a culture container coated with vitronectin. The produced aggregate was dissociated to obtain a population of single mesenchymal stem cells. Then, the obtained mesenchymal stem cells were cultured again in the serum-free medium in the presence of vitronectin, and it was confirmed that the number of cells was remarkably higher than that of mesenchymal stem cells cultured under the same conditions except that fibronectin was used instead of the first vitronectin. It was also confirmed that the TGFβ receptor inhibitor further increases the production efficiency of mesenchymal stem cells. Furthermore, it was found that mesenchymal stem cells can be produced from adipocytes containing mesenchymal stem cells by using vitronectin and a TGFβ receptor inhibitor.

Accordingly, the present invention provides the following.

(1) A method for producing a mesenchymal stem cell from a biological cell sample comprising mesenchymal stem cells, comprising the following steps:
  (1) a step of culturing the biological cell sample comprising mesenchymal stem cells in a serum-free medium in the presence of vitronectin or a partial peptide thereof capable of adhering mesenchymal stem cells,
  (2) a step of collecting a cell aggregate of the mesenchymal stem cells.

(2) The method of (1), wherein the culture in the presence of vitronectin or a partial peptide thereof capable of adhering mesenchymal stem cells is performed by culturing on a culture container on which vitronectin or a partial peptide thereof capable of adhering mesenchymal stem cells has been immobilized.

(3) The method of (1) or (2), further comprising the following steps:
  (3) a step of dissociating the collected cell aggregate,
  (4) a step of culturing the dissociated mesenchymal stem cells in a serum-free medium in the presence of an extracellular matrix protein or a partial peptide thereof capable of adhering mesenchymal stem cells,
  (5) a step of collecting the mesenchymal stem cells proliferated on the culture container via the extracellular matrix protein or a partial peptide thereof capable of adhering mesenchymal stem cells.

(4) The method of (3), wherein the culture in the presence of the extracellular matrix protein or a partial peptide thereof capable of adhering mesenchymal stem cells is performed by culturing on a culture container on which the extracellular matrix protein or a partial peptide thereof capable of adhering mesenchymal stem cells has been immobilized.

(5) The method of any one of (1) to (4), wherein the partial peptide of vitronectin comprises an RGD domain.

(6) The method of (5), wherein the partial peptide of vitronectin further comprises a somatomedin B domain.

(7) The method of (6), wherein the partial peptide of vitronectin is a polypeptide consisting of amino acid Nos. 1-379 of the amino acid sequence shown in SEQ ID NO: 1.

(8) The method of any one of (1) to (7), wherein the serum-free medium in step (1) comprises a TGF-β receptor inhibitor.

(9) A method for producing a mesenchymal stem cell from a biological cell sample comprising mesenchymal stem cells, comprising the following steps:
- (1) a step of culturing the biological cell sample comprising mesenchymal stem cells in a xeno-free medium in the presence of vitronectin or a partial peptide thereof capable of adhering mesenchymal stem cells,
- (2) a step of collecting a cell aggregate of the mesenchymal stem cells.

(10) The method of (9), wherein the culture in the presence of vitronectin or a partial peptide thereof capable of adhering mesenchymal stem cells is performed by culturing on a culture container on which vitronectin or a partial peptide thereof capable of adhering mesenchymal stem cells has been immobilized.

(11) The method of (9) or (10), further comprising the following steps:
- (3) a step of dissociating the collected cell aggregate,
- (4) a step of culturing the dissociated mesenchymal stem cells in a xeno-free medium in the presence of an extracellular matrix protein or a partial peptide thereof capable of adhering mesenchymal stem cells,
- (5) a step of collecting the mesenchymal stem cells proliferated on the culture container via the extracellular matrix protein or a partial peptide thereof capable of adhering mesenchymal stem cells.

(12) The method of (11), wherein the culture in the presence of the extracellular matrix protein or a partial peptide thereof capable of adhering mesenchymal stem cells is performed by culturing on a culture container on which the extracellular matrix protein or a partial peptide thereof capable of adhering mesenchymal stem cells has been immobilized.

(13) The method of any one of (9) to (12), wherein the partial peptide of vitronectin comprises an RGD domain.

(14) The method of (13), wherein the partial peptide of vitronectin further comprises a somatomedin B domain.

(15) The method of (14), wherein the partial peptide of vitronectin is a polypeptide consisting of amino acid Nos. 1-379 of the amino acid sequence shown in SEQ ID NO: 1.

(16) The method of any one of (9) to (15), wherein the xeno-free medium in step (1) comprises a TGF-β receptor inhibitor.

(17) The method of any one of (9) to (16), wherein the xeno-free medium comprises an allogeneic serum.

(18) The method of (17), wherein the allogeneic serum is an autologous serum.

(19) The method of any one of (1) to (18), wherein the biological cell sample comprising mesenchymal stem cells is a bone marrow-derived cell.

(20) The method of (19), wherein the number of the cells derived from bone marrow and to be cultured is $0.5 \times 10^5$-$25 \times 10^5$ cells/cm$^2$.

(21) The method of (19) or (20), wherein the cells derived from bone marrow are cultured for a period of 4 days to 14 days.

(22) The method of any one of (1) to (18), wherein the biological cell sample comprising mesenchymal stem cells is a cell derived from adipose tissue.

(23) The method of (22), wherein the number of the cells derived from adipose tissue and to be cultured is $1 \times 10^3$-$1 \times 10^6$ cells/cm$^2$.

(24) The method of (22) or (23), wherein the cells derived from adipose tissue are cultured for a period of 1 day to 14 days.

Advantageous Effects of Invention

Mesenchymal stem cells can be efficiently produced from a biological cell sample containing mesenchymal stem cells by culturing the biological cell sample containing mesenchymal stem cells in a serum-free medium or a xeno-free medium in the presence of vitronectin or a partial peptide thereof. By adopting this method, the obtained mesenchymal stem cells can be directly used as a cell source in regenerative medicine.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
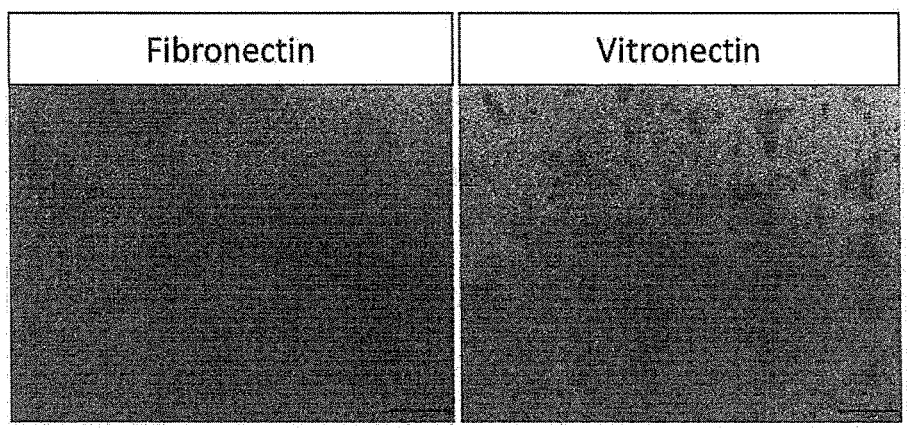
FIG. 1 shows photographs of MSC aggregates 5 days after MNC seeding.

The present invention provides a method for producing a mesenchymal stem cell from a biological cell sample containing mesenchymal stem cells (hereinafter, the production method of the present invention).

In the present specification, the biological cell sample containing mesenchymal stem cells is a cell sample separated from a biological tissue containing mesenchymal stem cells. As the biological tissue containing mesenchymal stem cells, tissues of bone marrow, fat, synovium, alveolar bone, periodontal membrane, placenta, cord blood, umbilical cord and the like can be mentioned.

In the present specification, the cell sample is a cell population contained in a biological tissue. The cell population means two or more cells of the same type or different types. In addition, the cell population also means a clump (mass) of cells of the same or different types. The cell population may be a primary cell directly separated from a biological tissue, or may be a cell that is passage cultured from the primary cell. As used herein, directly means not going through the step of culturing and/or proliferating in vitro.

In the present specification, the mesenchymal stem cell is a somatic stem cell derived from a mesodermal tissue (mesenchyma). The mesenchymal stem cell expresses positive markers on the cell surface and does not express negative markers. By detecting both markers on the cell surface, whether or not the cell is a mesenchymal stem cell can be determined. Positive markers include CD73, CD90, and CD105. Negative markers include CD11b, CD14, CD19, CD34, CD45, CD79a, HLA-Class II(DR). The expression of these markers can be examined by a known immunological method (e.g., flow cytometry using an antibody) or the like.

In one embodiment, the production method of the present invention includes the following steps:
 (1a) a step of culturing the biological cell sample containing mesenchymal stem cells in a serum-free medium in the presence of vitronectin or a partial peptide thereof capable of adhering mesenchymal stem cells (step (1a) of the present invention),
 (2a) a step of collecting a cell aggregate of the mesenchymal stem cells (step (2a) of the present invention).

In another embodiment, the production method of the present invention includes the following steps:
 (1b) a step of culturing the biological cell sample containing mesenchymal stem cells in a xeno-free medium in the presence of vitronectin or a partial peptide thereof capable of adhering mesenchymal stem cells (step (1b) of the present invention),
 (2b) a step of collecting a cell aggregate of the mesenchymal stem cells (step (2b) of the present invention).

In steps (1a) and (1b) of the present invention, culture is performed in the presence of vitronectin or a partial peptide thereof capable of adhering mesenchymal stem cells (hereinafter to be referred to as "the partial peptide of vitronectin").

Vitronectin may be, for example, a protein isolated and purified from the cells of mammals (e.g., human, mouse, rat, rabbit, sheep, swine, bovine, horse, cat, dog, monkey, chimpanzee and the like), or any tissue or organ in which those cells are present. In addition, it may also be a protein chemically synthesized or biochemically synthesized by a cell-free translation system, or a recombinant protein produced from a transformant into which a nucleic acid having a base sequence encoding vitronectin has been introduced.

The amino acid sequence of vitronectin is disclosed in a known database, and for example, NP_000629 (human vitronectin), NP_035837 (mouse vitronectin) and the like are disclosed as NCBI Reference Sequence Nos. Since the mesenchymal stem cells produced by the production method of the present invention preferably do not contain xenogeneic components, the vitronectin is preferably derived from a living body from which the cell sample to be cultured is derived. Therefore, when the cell sample to be cultured is derived from human, the vitronectin used in the production method of the present invention is preferably a protein containing the same or substantially the same amino acid sequence as SEQ ID NO: 1.

Examples of the amino acid sequence substantially the same as the amino acid sequence shown in SEQ ID NO: 1 include amino acid sequences having a homology of not less than about 60%, preferably not less than about 70%, further preferably not less than about 80%, particularly preferably not less than about 90%, with the amino acid sequence shown in SEQ ID NO: 1, and the like. As used herein, the "homology" means the proportion (%) of the same amino acid residues and similar amino acid residues relative to the total overlapping amino acid residues, in an optimal alignment (preferably, the algorithm is capable of considering introduction of gap into one of or both of the sequences for optimal alignment), when two amino acid sequences are aligned using a mathematical algorithm known in the technical field.

The homology of the amino acid sequences in the present specification can be calculated using homology calculation algorithm NCBI BLAST (National Center for Biotechnology Information Basic Local Alignment Search Tool) and under the following conditions (expectancy=10; gap allowed; matrix=BLOSUM62; filtering=OFF).

More preferably, an amino acid sequence substantially the same as the amino acid sequence shown in SEQ ID NO: 1 is an amino acid sequence having identity of not less than about 60%, preferably not less than about 70%, further preferably not less than about 80%, particularly preferably not less than about 90%, with the amino acid sequence shown in SEQ ID NO: 1.

As the protein containing an amino acid sequence substantially the same as the amino acid sequence shown in SEQ ID NO: 1, for example, a protein containing an amino acid sequence substantially the same as the aforementioned amino acid sequence shown in SEQ ID NO: 1 and having activities substantially equivalent to those of a protein containing the amino acid sequence shown in SEQ ID NO: 1 and the like is preferable.

Examples of the substantially equivalent activity include mesenchymal stem cell adhesion activity. Being "substantially equivalent" means that the activities thereof are qualitatively (e.g., physiological or pharmacologically) the same. Therefore, while the mesenchymal stem cell adhesion activity is preferably equivalent (e.g., about 0.5- to about 2-fold), the levels of these activities, and quantitative factors such as molecular weight of protein, and the like may be different.

The human vitronectin also encompasses, for example, proteins containing (1) an amino acid sequence resulting from deletion of one or two or more (preferably 1-about 10) amino acids from the amino acid sequence shown in SEQ ID NO: 1, (2) an amino acid sequence resulting from addition of one or two or more (preferably 1-about 10) amino acids to the amino acid sequence shown in SEQ ID NO: 1, (3) an amino acid sequence resulting from insertion of one or two or more (preferably 1-about 10) amino acids in the amino acid sequence shown in SEQ ID NO: 1, (4) an amino acid sequence resulting from substitution of one or two or more (preferably 1-about 10) amino acids with other amino acids in the amino acid sequence shown in SEQ ID NO: 1, (5) an amino acid sequence which is a combination thereof, and the like.

As mentioned above, when the amino acid sequence is inserted, deleted, or substituted, the position of the insertion, deletion, or substitution is not particularly limited as long as the activity of the protein is maintained.

The partial peptide of vitronectin is a peptide having the above-mentioned partial amino acid sequence of vitronectin, and may be any as long as it has activity substantially equivalent to that of vitronectin. As used herein, the "substantially equivalent activity" has the same meaning as described above. The "substantially equivalent activity" can be measured in the same manner as in the case of vitronectin. Such partial peptide of vitronectin includes proteins containing the RGD domain. More preferably, the partial peptide of vitronectin is a protein containing a somatomedin B domain and an RGD domain.

Specifically, as the somatomedin B domain, for example, the region shown by amino acid No. 1-40 in the amino acid sequence shown in SEQ ID NO: 1 is used. As the RGD domain, for example, the region shown by amino acid No. 41-52 in the amino acid sequence shown in SEQ ID NO: 1 is used. The size of the partial peptide of vitronectin is not particularly limited as long as it has mesenchymal stem cell adhesion activity. It preferably contains not less than 100 partial amino acid sequences, more preferably not less than 200 partial amino acid sequences, further preferably not less than 300 partial amino acid sequences. The partial amino acid sequence may be one continuous partial amino acid sequence, or may be a plurality of discontinuous partial amino acid sequences linked together. The most preferable partial peptide of vitronectin satisfying such conditions includes a polypeptide consisting of amino acid Nos. 1-379 of the amino acid sequence shown in SEQ ID NO: 1.

In addition, as the partial peptide of vitronectin, a commercially available partial peptide of vitronectin may be used. Examples of the commercially available partial peptide of vitronectin include Vitronectin (20-398 aa) (wake), Vitronectin (VTN-N, 62-478 aa) (manufactured by Thermo Fisher Scientific), Vitronectin (Full length, 20-478 aa) (Sigma), synthemax II (manufactured by Corning Incorporated), and the like.

In step (1a) or (1b) in the present invention, the biological cell sample containing mesenchymal stem cells is cultured in the presence of vitronectin or a partial peptide of vitronectin by any method that brings mesenchymal stem cells into contact with vitronectin or a partial peptide of vitronectin. For example, a method of culturing in a state where vitronectin or a partial peptide of vitronectin is present in a culture medium or the surface of a culture container can be mentioned. The presence of vitronectin or a partial peptide of vitronectin in a culture medium means an embodiment in which it is directly contained in the culture medium. When vitronectin or a partial peptide of vitronectin is contained in a culture medium, the concentration of the vitronectin or the partial peptide of vitronectin in the culture medium is 0.1 μg/ml-4.0 μg/ml, preferably 1.0 μg/ml-4.0 μg/ml.

The presence of vitronectin or a partial peptide of vitronectin on the surface of a culture container means an embodiment in which it is immobilized on the surface of the culture container. When vitronectin or a partial peptide of vitronectin is immobilized on the surface of a culture container, for example, a container or a carrier (microbeads, etc.) used for cell culture is used as the culture container. As the culture container, any material with any shape can be used as long as it does not inhibit maintenance, survival, differentiation, maturation, and self-replication of the cells. Examples of the material of the culture container include glass, synthetic resin including non-woven fabric, natural resin, metal and the like. The shape of the culture container includes polygonal prisms such as triangular prism, cube, cuboid and the like, polygonal pyramids such as circular cylinder, triangular pyramid, quadrangular pyramid and the like, arbitrary shapes such as circular cone, gourd and the like, globular shape, hemisphere shape, circular shape, ellipse shape, semicircle shape, and the like. Commercially available culture flask, culture dish (culture dish), culture bag, hollow thread type culture device, and the like can also be used. A culture bag having gas permeability is preferred. When a large number of cells is required, a large fermenter may also be used. The culture can be performed in either an open system or a closed system. When the purpose is to administer the obtained mesenchymal stem cells to human or the like, it is preferable to perform the culture in a closed system.

Vitronectin or a partial peptide of vitronectin can be immobilized in a culture container based on a known means. For example, vitronectin or a partial peptide of vitronectin is dissolved in a solvent (e.g., sterile distilled water, buffer, saline, etc.), added to a culture container, and then allowed to stand overnight at 4° C., whereby vitronectin or partial peptide of vitronectin can be immobilized on a culture container. When vitronectin or a partial peptide of vitronectin is immobilized on a culture container, those of ordinary skill in the art can appropriately determine the concentration of a vitronectin or partial peptide of vitronectin solution. For example, the concentration may be set such that 0.5 μg-10.0 μg of vitronectin or a partial peptide of vitronectin is generally immobilized per unit area of the culture container.

The culture container on which vitronectin or a partial peptide of vitronectin is immobilized can be stored at a low temperature, for example, 4° C. until use. Immediately before use, a solution containing vitronectin or a partial peptide of vitronectin is removed by suction from these culture containers, washed once with PBS and then once with a culture medium, and then subjected to culture.

In step (1a) of the present invention, the serum-free medium is not particularly limited as long as it does not contain serum. Therefore, as long as serum is not contained, the serum-free medium may contain a component derived from the same species as the species from which the biological cell sample containing mesenchymal stem cells to be cultured is derived (allogeneic component) or a component derived from a different species (xenogeneic component). Examples of the allogeneic component include platelet lysate, serum-derived protein (e.g., albumin, etc.), and the like. Examples of the xenogeneic component include animal-derived lipid, and the like.

In step (1b) of the present invention, the xeno-free medium is not particularly limited as long as it does not contain a xenogeneic component. Therefore, as long as a xenogeneic component is not contained, the xeno-free medium may contain an allogeneic serum. As the allogeneic serum, an autologous serum is preferred. As used herein, the autologous serum, and the below-mentioned autologous plasma respectively mean serum and plasma obtained from blood collected from the same donor as the biological cell sample to be cultured.

Since plasma contains serum components, a medium containing autologous plasma may be used. Preferably, inactivated autologous plasma is added to the medium. For example, cells are cultured in a culture medium containing not more than 10% (V/V), preferably not more than 5% (V/V), further preferably not more than 2% (V/V), of inactivated autologous plasma. By using autologous plasma, xenogeneic components are excluded from the production method of the present invention, and a highly safe method for producing mesenchymal stem cells is provided.

A serum-free medium or xeno-free medium can be prepared using a medium generally used for culturing animal cells as a basal medium. Examples of the basal medium include, but are m not limited to, Dulbecco's Medium (e.g., IMDM), Eagle's medium (e.g., DMEM, EMEM, BME, MEM, aMEM), Ham's medium (e.g., F10 medium, F12 medium), RPMI medium (e.g., RPMI-1640 medium, RPMI-1630 medium), MCDB medium (e.g., MCDB104, 107, 131, 151, 153 medium), Fischer's medium, 199 medium, culture medium for primate ES cell (culture medium for primate ES/iPS cell, Reprocell), medium for mouse ES cell (TX-WES culture medium, Thromb-X), serum-free medium (mTeSR, Stemcell Technologies), ReproFF, StemSpan (registered trade mark) SFEM, StemSpan (registered trade mark) H3000, Stemlinell, ESF-B medium, ESF-C medium, CSTI-7 medium, Neurobasal medium (Life Technologies, Inc.), StemPro-34 medium, StemFit (registered trade mark) (e.g., StemFit AK03N, StemFit AK02N) and the like. Furthermore, these media can be mixed as necessary and used and, for example, DMEM/F12 medium and the like can be mentioned. As a serum-free medium or a xeno-free medium, a known medium or a commercially available medium may be used as it is or after modification. As the commercially available xeno-free medium, for example, DEF-CS500 XF (manufactured by Cellartis) or DXF (manufactured by PromoCell) can be used.

In step (1a) or (1b) in the present invention, a serum-free medium or a xeno-free medium may contain a TGF-β receptor inhibitor. TGF-β is a peptide factor that is secreted as a non-active form from almost all normal cells, activated under specific conditions, and exhibits various functions such as suppression of the proliferation of epithelial cells and lymphocytes, and the like. Furthermore, osteogenic factor (BMP) that induces differentiation of osteoblast, activin that promotes secretion of follicle-stimulating hormone and differentiation of erythrocyte, and the like can be mentioned as TGF-β family molecules having a structure similar to TGF-β. In the present specification, TGF-β also includes TGF-β family molecules. Specifically, as TGF-β, TGF-β, activin, Nodal, BMP, GDF (growth/differentiation factor), AMH (anti-Mollerian hormone), and MIS (Mullerian inhibitory substance) can be mentioned, with preference given to TGF-β. The TGF-β receptor is composed of type I and type II receptors present on the cell membrane. Both type I and type II receptors have serine/threonine kinase activity, and the substrate for type II receptor is type I receptor. When the TGF-β family molecule binds to TGF-β receptor, type I receptor is phosphorylated by type II receptor, and the activated type I receptor further phosphorylates intracellular signal transduction molecule Smad, and transmits signals into the cell. Specifically, as the combination of type I receptor and type II receptor of TGF-β receptor, a combination of TGF-β type I receptor (TGFBR1, activin receptor-like kinase (ALK5)) or ALK1, and TGF-β type II receptor (TGFBR2) can be mentioned for TGF-β; a combination of ALK4 or ALK7, and ActR-II or ActR-IIB can be mentioned for activin, Nodal; a combination of ALK2, ALK3 or ALK6, and BMPR-II can be mentioned for BMP; a combination of ALK2, ALK3 or ALK6, and ActR-II or ActR-IIB can be mentioned for GDF; and a combination of ALK2, ALK3 or ALK6, and ActR-II or ActR-IIB can be mentioned for AMH or MIS. As a preferable combination of type I receptor and type II receptor of TGF-β receptor, a combination of ALK5 or ALK1, and TGFBR2 can be mentioned. The above-mentioned inhibitor of TGF-β receptor may be any as long as it suppresses the above-mentioned functions of the TGF-β receptor and, for example, a substance that inhibits formation of TGF-β and TGF-β receptor complex, and the like can be mentioned.

To be specific, as the TGF-β receptor inhibitor, for example, neutralizing antibodies against TGF-β receptor can be mentioned. The antibody may be either a polyclonal antibody or a monoclonal antibody. These antibodies can be produced according to a production method of antibody or antiserum known per se. While the isotype of the antibody is not particularly limited, IgG, IgM or IgA is preferred, and IgG is particularly preferred. The antibody is not particularly limited as long as it has at least a complementarity determining region (CDR) for specifically recognizing and binding to a target antigen, and may be a complete antibody molecule, a fragment such as Fab, Fab', F(ab')$_2$ or the like, a genetically engineered conjugate molecule such as scFv, scFv-Fc, minibody, diabody or the like, a derivative thereof modified with a molecule having a protein stabilizing action such as polyethylene glycol (PEG) or the like, or the like. Since the neutralizing antibody is a neutralizing antibody contained in a serum-free medium or a xeno-free medium, when the biological cell sample is derived from human, it is preferable to (i) obtain a human antibody by immunizing a human antibody-producing animal (e.g., mouse), (ii) produce a chimeric antibody, humanized antibody or complete human antibody, or (iii) obtain a human antibody by combining ex-vivo immunization method and cell immortalization by virus, human-human (or mouse) hybridoma production technique, a phage display method, and the like. The concentration of a neutralizing antibody against TGF-β receptors in a serum-free medium or a xeno-free medium is not particularly limited as long as it can inhibit intracellular signal transduction of the TGF-β receptor, and is, for example, 0.01 µg/mL-10 µg/mL, preferably 0.05 µg/mL-5 µg/mL, more preferably 0.1 µg/mL-2.5 µg/mL.

In another preferred embodiment, the TGF-β receptor inhibitor is a low-molecular-weight compound showing an antagonist activity against TGF-β receptors. As used herein, the "antagonist activity" means an activity to bind to TGF-β receptor to inhibit the binding between TGF-β and TGF-β receptor. Examples of such compound include SB431542 (Stemgent), sc-203294, RepSox, Vactosertib (TEW-7197), SB525334, GW788388, SB505124, SD-208, LDN-193189, Galunisertib (LY2157299), LY2109761, LY364947, K02288, LDN-214117, ML347, LDN-212854, DMH1, Pirfenidone, LY 3200882, Alantolactone, SIS3, Hesperetin, A-83-01 and the like. The concentration of a low-molecular-weight compound showing an antagonist activity against TGF-β receptors in a serum-free medium or a xeno-free medium is not particularly limited as long as it can inhibit intracellular signal transduction of the TGF-β receptor, and is, for example, 0.1 µM-100 µM, preferably 1 µM-50 µM, more preferably 5 µM-25 µM.

The serum-free medium or xeno-free medium may be further appropriately supplemented with insulin, transferrin, selenium, various vitamins, L-glutamine, various amino acids such as non-essential amino acid and the like, 2-mercaptoethanol, various cytokines (interleukins (IL-2, IL-7, IL-15 etc.), SCF (Stem cell factor), activin and the like), various hormones, various growth factors (Leukemia inhibitory factor (LIF), basic fibroblast growth factor (bFGF), etc.), antibiotics such as penicillin/streptomycin, puromycin and the like, pH indicator such as phenol red and the like, and the like.

The biological cell sample containing mesenchymal stem cells which is cultured in step (1a) or (1b) of the present invention is not particularly limited as long as it is a cell sample containing mesenchymal stem cells. In one embodiment of the present invention, the biological cell sample containing mesenchymal stem cells is a bone marrow-derived cell. The method for separating the cell derived from bone marrow may follow a known means. For example, it can be performed by removing interstitial cells from the collected bone marrow fluid by a density gradient centrifugation method using a separation medium with adjusted density. Specifically, a layer of bone marrow-derived cells containing mesenchymal stem cells and mononuclear cells at the interface between the separation medium and the cerebrospinal fluid can be obtained by layering a bone marrow fluid diluted with physiological saline on the upper part of the separation medium in a tube and centrifuging same. The thus-obtained bone marrow-derived cells contain a trace amount of mesenchymal stem cells. The proportion of the mesenchymal stem cells contained in the bone marrow-derived cells is not particularly limited, and is about 0.01%-about 1%, preferably about 0.01%-about 0.1%, of the number of cells iv derived from the bone marrow.

The number of the bone marrow-derived cells including the mesenchymal stem cells cultured in step (1a) or (1b) of the present invention is not particularly limited, and may be generally $0.5 \times 10^5$ cells/cm$^2$-$25 \times 10^5$ cells/cm$^2$, preferably $2 \times 10^5$ cells/cm$^2$-$13 \times 10^5$ cells/cm$^2$, per a culture container.

The culture conditions for the bone marrow-derived cells containing mesenchymal stem cells are not particularly limited, and general cell culture conditions can be adopted. While the aforementioned culture conditions include culturing at temperature 37° C., humidity 95%, and $CO_2$ concentration 5%, but the present invention is not limited to such conditions. For example, culturing at temperature 30-40° C., humidity 90-98%, $CO_2$ concentration 3-7% is exemplified. However, as long as proliferation of desired cells can be achieved, temperature, humidity, and $CO_2$ concentration outside the ranges mentioned above may also be employed.

It is preferable to change the medium at appropriate intervals during the culture. The exchange of the medium includes the exchange of the whole amount of the medium, the exchange of a part of the medium, the addition of the medium, a combination thereof, and the like. In a preferred embodiment of the present invention, the whole amount of the medium is exchanged with a medium having the same composition the day after the start of the culture, and the cells are cultured with the addition of 20% of the medium on day 3 and day 5 from the start of the culture.

The culture period is, for example, 4 to 14 days, preferably 7 days. By this culture, mesenchymal stem cells contained in bone marrow-derived cells can be selectively adhered onto a culture container via vitronectin or a partial peptide of vitronectin. Adhered mesenchymal stem cells form cell aggregates. Here, the cell aggregate includes any cell populations of a cell population that has proliferated so as to spread parallel to the adhesive surface of the culture container, a cell population that has proliferated so as to vertically overlap the adhesive surface of the culture container, and a cell population having the characteristics of the both. When the culture period is less than 4 days, the number of cell aggregates that can be formed is small, and the number of cells for culturing in step (4) in the present invention to be described later cannot be secured. Furthermore, when the culture period exceeds 14 days, the cell aggregates collapse and the number of cells decreases. As a result, the number of cells for culturing in step (4) in the present invention cannot be secured.

In another embodiment, the biological cell sample containing mesenchymal stem cells which is cultured in step (1a) or (1b) of the present invention is a cell derived from an adipose tissue. The method for separating the cell derived from an adipose tissue from the adipose tissue may follow a known means. For example, as a method for separating adipose tissue-derived cells including mesenchymal stem cells from adipose tissue, the collected adipose tissue is shredded, incubated in a collagenase solution, and filtered with a mesh sheet, whereby adipose tissue-derived cells including mesenchymal stem cells can be obtained. The thus-obtained cell derived from the adipose tissue contains a trace amount of mesenchymal stem cells. The proportion of the mesenchymal stem cells contained in the cells derived from the adipose tissue is not particularly limited, and is about 0.01%-about 1%, preferably about 0.1%-about 1%, of the number of cells derived from the adipose tissue.

The number of adipose tissue-derived cells including the mesenchymal stem cells cultured in step (1a) or (1b) of the present invention is not particularly limited, and may be generally $1 \times 10^3$ cells/cm$^2$-$1 \times 10^6$ cells/cm$^2$, preferably $1 \times 10^4$ cells/cm$^2$-$1 \times 10^5$ cells/cm$^2$, per a culture container.

The culture conditions for the adipose tissue-derived cells containing mesenchymal stem cells are not particularly limited, and culture conditions similar to those for bone marrow-derived cells containing mesenchymal stem cells can be adopted.

It is preferable to change the medium at appropriate intervals during the culture. The exchange of the medium includes the exchange of the whole amount of the medium, the exchange of a part of the medium, the addition of the medium, a combination thereof, and the like. In a preferred embodiment of the present invention, the whole amount of the medium is exchanged with a medium having the same composition the day after the start of the culture and on day 2.

The culture period is, for example, 1 to 14 days, preferably 5 days. By this culture, mesenchymal stem cells contained in adipose tissue-derived cells can be selectively adhered onto a culture container via vitronectin or a partial peptide of vitronectin. Adhered mesenchymal stem cells form cell aggregates, particularly, a cell population that has proliferated so as to spread parallel to the adhesive surface of the culture container.

The cell aggregate that is formed by mesenchymal stem cells adhered onto a culture container via vitronectin or a partial peptide of vitronectin in step (2a) or (2b) in the present invention can be collected by a known means. For example, cells other than the mesenchymal stem cells contained in the biological cell sample do not adhere onto a culture container via vitronectin or a partial peptide of vitronectin. Therefore, they are removed from the culture container together with the serum-free medium or xeno-free medium by total amount medium change. As a result, cell aggregates of mesenchymal stem cells remain in the culture container in the culture after total medium exchange. The cell aggregates of mesenchymal stem cells adhere to the culture container via vitronectin or a partial peptide of vitronectin. However, the cell aggregates also show weak cell-cell adhesion and easily separate from the cell aggregates and float in the medium. Therefore, the recovery of cell aggregates of mesenchymal stem cells may contain 2 steps of (i) recovery of cell aggregates of mesenchymal stem cells suspended in a serum-free medium or a xeno-free medium and (ii) recovery of cell aggregates of mesenchymal stem cells adhered on the culture container. The (i) recovery of cell aggregates of mesenchymal stem cells suspended in a serum-free medium or a xeno-free medium can be performed, for example, by recovering the entire amount of the serum-free medium or xeno-free medium and centrifuging same. The (ii) recovery of cell aggregates of mesenchymal stem cells adhered on the culture container can be performed, for example, by easily detaching the aggregates from the culture container only by pipetting, collecting the entire amount together with the medium or PBS, and centrifuging same. In another embodiment, for the recovery of cell aggregates of mesenchymal stem cells adhered on the culture container, adhesion between vitronectin or a partial peptide of vitronectin, and the cell aggregates of mesenchymal stem cells is decomposed by a treatment with a detaching agent, and monocelled mesenchymal stem cells can be recovered. As the detaching agent, a mixed solution of trypsin and EDTA (generally 0.001-0.5% trypsin/0.1-5 mM EDTA, preferably about 0.1% trypsin/1 mM EDTA) may also be used, or a commercially available product (e.g., TrypLE (Thermo Fisher Scientific)) may also be used.

Vitronectin and a partial peptide of vitronectin show high adhesion activity to mesenchymal stem cells as compared with other extracellular matrices, and can efficiently adhere to mesenchymal stem cells contained in biological cell samples. Therefore, mesenchymal stem cells can be efficiently produced from a biological cell sample by doing as described above. However, when the cell aggregates of the mesenchymal stem cells adhered in step (1a) or (1b) in the present invention are continuously cultured for a long period of time, the proliferation of the mesenchymal stem cells is not observed depending on the origin of the cell sample. For example, when bone marrow-derived cells are cultured in step (1a) or (1b) in the present invention and cell aggregates of adhered mesenchymal stem cells are continuously cultured for a long period of time, proliferation of the mesenchymal stem cells is not observed. On the other hand, when the adipose tissue-derived cells are cultured in step (1a) or (1b) in the present invention, the cell aggregates of the adhered mesenchymal stem cells show confirmed proliferation. This is considered to be due to the presence of cells in the bone marrow-derived cells that prevent the proliferation of mesenchymal stem cells. Thus, when a large amount of mesenchymal stem cells is desired to be produced from biological cell samples containing mesenchymal stem cells by steps (1a) and (2a) or steps (1b) and (2b) in the present invention, it is preferable to re-seed the produced mesenchymal stem cells, proliferate them, and recover them again. Therefore, the production method of the present invention may further contain the following steps.

That is, a production method containing steps (1a) and (2a) of the present invention may further contain the following steps:

(3a) a step of dissociating the collected cell aggregate (step
(3a) of the present invention),
(4a) a step of culturing the dissociated mesenchymal stem cells in a serum-free medium in the presence of an extracellular matrix protein or a partial peptide thereof capable of adhering mesenchymal stem cells (step (4a) of the present invention),
(5a) a step of collecting the mesenchymal stem cells proliferated on the culture container via the extracellular matrix protein or a partial peptide thereof capable of adhering mesenchymal stem cells (step (5a) of the present invention). In addition, a production method containing steps (1b) and (2b) of the present invention may further contain the following steps:
(3b) a step of dissociating the collected cell aggregate (step
(3b) of the present invention),
(4b) a step of culturing the dissociated mesenchymal stem cells in a xeno-free medium in the presence of an extracellular matrix protein or a partial peptide thereof capable of adhering mesenchymal stem cells (step (4b) of the present invention),
(5b) a step of collecting the mesenchymal stem cells proliferated on the culture container via the extracellular matrix protein or a partial peptide thereof capable of adhering mesenchymal stem cells (step (5b) of the present invention).

In step (3a) or (3b) in the present invention, the dissociation of the recovered cell aggregate is performed by a known means. Since cell aggregates show weak cell-cell adhesion, for example, cell-cell adhesion of cell aggregates can be easily eliminated by pipetting alone, and a cell population of single mesenchymal stem cells can be prepared. Alternatively, it can also be performed by treating with the above-mentioned detaching agent.

In step (4a) or (4b) in the present invention, the culture container used for culturing, serum-free medium, xeno-free medium, the mode of contact between mesenchymal stem cells and extracellular matrix proteins during culture, and the like may be the same as those in step (1a) or (1b) in the present invention.

In step (4a) or (4b) in the present invention, culture is performed in the presence of an extracellular matrix protein or a partial peptide thereof capable of adhering mesenchymal stem cells (hereinafter to be indicated as "partial peptide of extracellular matrix protein"). The extracellular matrix protein is not particularly limited as long as it can cause adhesion of mesenchymal stem cells to a culture container. Examples of such extracellular matrix protein include vitronectin, fibronectin, laminin, collagen and the like. In addition, examples of the partial peptide of an extracellular matrix protein include iMatrix-511 (partial peptide of laminin-511) and the like.

Like vitronectin, the extracellular matrix protein may be any of a protein isolated and purified from mammalian cells, etc., a biochemically-synthesized protein, and a recombinant protein produced from a transformant incorporating a nucleic acid having a base sequence encoding an extracellular matrix protein.

In addition, the partial peptide of the extracellular matrix protein may be any as long as it is a peptide having a partial amino acid sequence of the extracellular matrix protein and has mesenchymal stem cell adhesion activity. Examples of such partial peptide of extracellular matrix protein include proteins containing at least one domain selected from the group consisting of RGD domain and heparin binding domain.

The tissue from which the mesenchymal stem cells seeded in step (4a) or (4b) in the present invention is derived is not particularly limited. In step (1a) or (1b) in the present invention, a tissue in which mesenchymal stem cells of cell aggregates do not grow sufficiently is preferred. Examples of such tissue include bone marrow, cord blood and the like. Even when the mesenchymal stem cells of the cell aggregates proliferate in step (1a) or (1b) of the present invention, mesenchymal stem cells may be cultured in step (4a) or (4b) in the present invention for the purpose of further increasing the number of mesenchymal stem cells.

The number of the mesenchymal stem cells seeded in step (4a) or (4b) in the present invention is not particularly limited, and may be generally $2\times10^5$ cells/cm$^2$-$26\times10^5$ cells/cm$^2$, preferably $8\times10^5$ cells/cm$^2$-$13\times10^5$ cells/cm$^2$, per a culture container.

The culture conditions for the mesenchymal stem cells are not particularly limited, and may be the same as those for the biological cell sample containing mesenchymal stem cells. General cell culture conditions can be adopted.

It is preferable to change the medium at appropriate intervals during the culture. The exchange of the medium includes the exchange of the whole amount of the medium, the exchange of a part of the medium, the addition of the medium, a combination thereof, and the like. In a preferred embodiment of the present invention, the whole amount of the medium is exchanged with a medium having the same composition every 2 or 3 days from the day when the culture was started.

The culture period is, for example, 1 to 14 days, preferably 1 to 8 days. By this culture, mesenchymal stem cells start to proliferate.

The mesenchymal stem cells that have proliferated on a culture container via an extracellular matrix protein or a partial peptide of the extracellular matrix protein in step (5a) or (5b) in the present invention are collected by a known means. The means of collection may be the same as the method described in step (2a) or (2b) in the present invention.

Other features of the invention will become apparent in the course of the following descriptions of exemplary embodiments which are given for illustration of the invention and are not intended to be limiting thereof.

EXAMPLES

Example 1: Study of Mesenchymal Stem Cell (MSC) Production Promoting Effect by Vitronectin Due to the limitations of purification techniques, bone marrow mononuclear cells (MNC) separated from bone marrow are slightly contained with mesenchymal stem cells (MSC). In this Example, a method for producing MSC from MNC by using a serum-free medium is verified. Bone marrow mononuclear cells (MNC) (Lonza) were thawed using the following medium for seeding. The above-mentioned cells were seeded at a concentration of $2.6 \times 10^6$ cells/well in a 24-well plate coated with Fibronectin (Sigma) or Vitronectin (wako) each at a concentration of 1.5 µg/cm$^2$, and cultured under the conditions of 37° C., 5% $CO_2$. The next day of seeding, the entire amount of the medium in the plate was replaced with a medium for seeding, and the medium for seeding in an amount corresponding to 20% of the amount of the medium in the plate was further added on day 3 and day 5 after seeding. Medium for seeding: StemFit (registered trade mark) AKO3N medium (Ajinomoto Co., Inc.) SOLUTION A, StemFit (registered trade mark) AKO3N medium (Ajinomoto Co., Inc.) SOLUTION B, 3 ng/mL bFGF (peprotech), 10 µM SB431542 (Stemgent), 1/100 Lipid Concentrate (Life Technologies), 10 nM Dexamethasone (Sigma-Aldrich), 10 ng/mL PDGF-BB (FUJIFILM Wako Pure Chemical Industries, Ltd.), 1 mM Lithium Chloride (Sigma-Aldrich)

FIG. 1 shows photographs of the cells on day 5 after seeding. More cell aggregates were formed in a well plate coated with Vitronectin than in a well plate coated with Fibronectin.

Aggregates were collected day 7 after seeding and the cells were re-seeded using the following medium for proliferation. Specifically, after collecting the culture supernatant, DPBS (Nacalai Tesque) was added to the plate, and the aggregates were detached from the plate by pipetting, and all aggregates were collected together with DPBS. Thereafter, the collected culture supernatant and DPBS were combined and centrifuged, and only the aggregates were collected. The aggregates were dissociated into single cells by re-suspending the collected aggregates in the proliferation medium. Using Fibronectin (Sigma), Vitronectin (wako) and iMatrix-511 (Nippi, Inc.), the entire amount of the collected cells was seeded in 24-well plates coated with Fibronectin or Vitronectin at a concentration of 1.5 µg/cm$^2$, or iMatrix-511 at a concentration of 0.5 µg/cm$^2$, and cultured under the conditions of 37° C., 5% $CO_2$. Thereafter, the entire amount of the medium in the plate was replaced with the medium for proliferation every 2-3 days until the cells became sub-confluent.

Medium for proliferation: StemFit (registered trade mark) AKO3N medium (Ajinomoto Co., Inc.) SOLUTION A, ¼ StemFit (registered trade mark) AKO3N medium (Ajinomoto Co., Inc.) SOLUTION B, StemFit (registered trade mark) AKO3N medium (Ajinomoto Co., Inc.) SOLUTION C, 1/100 Lipid Concentrate (Life Technologies), 10 nM Dexamethasone (Sigma-Aldrich), 10 ng/mL PDGF-BB (FUJIFILM Wako Pure Chemical Industries, Ltd.), 1 mM Lithium Chloride (Sigma-Aldrich)

Figure 2:
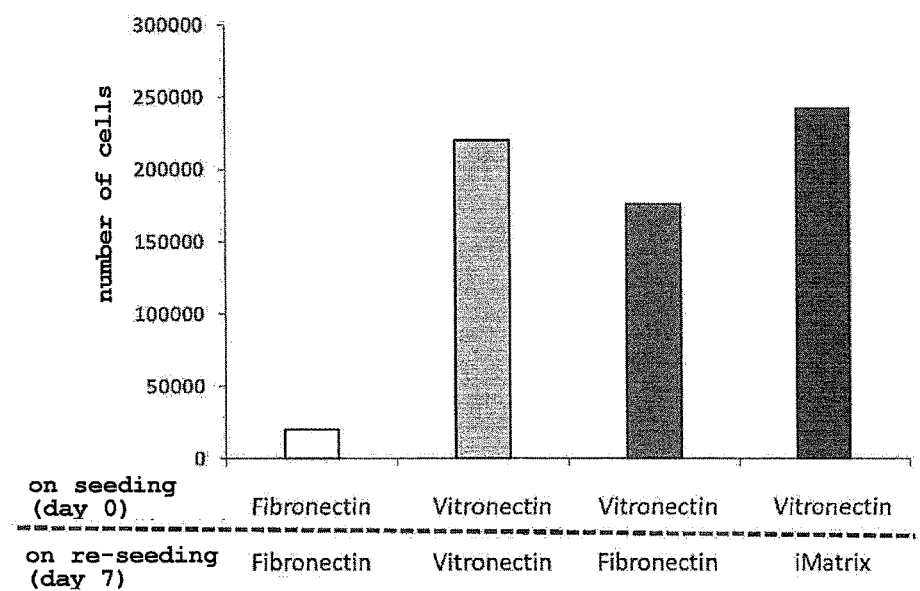
FIG. 2 shows the measurement results of the number of cells 13 days after MNC seeding.
Figure 3:
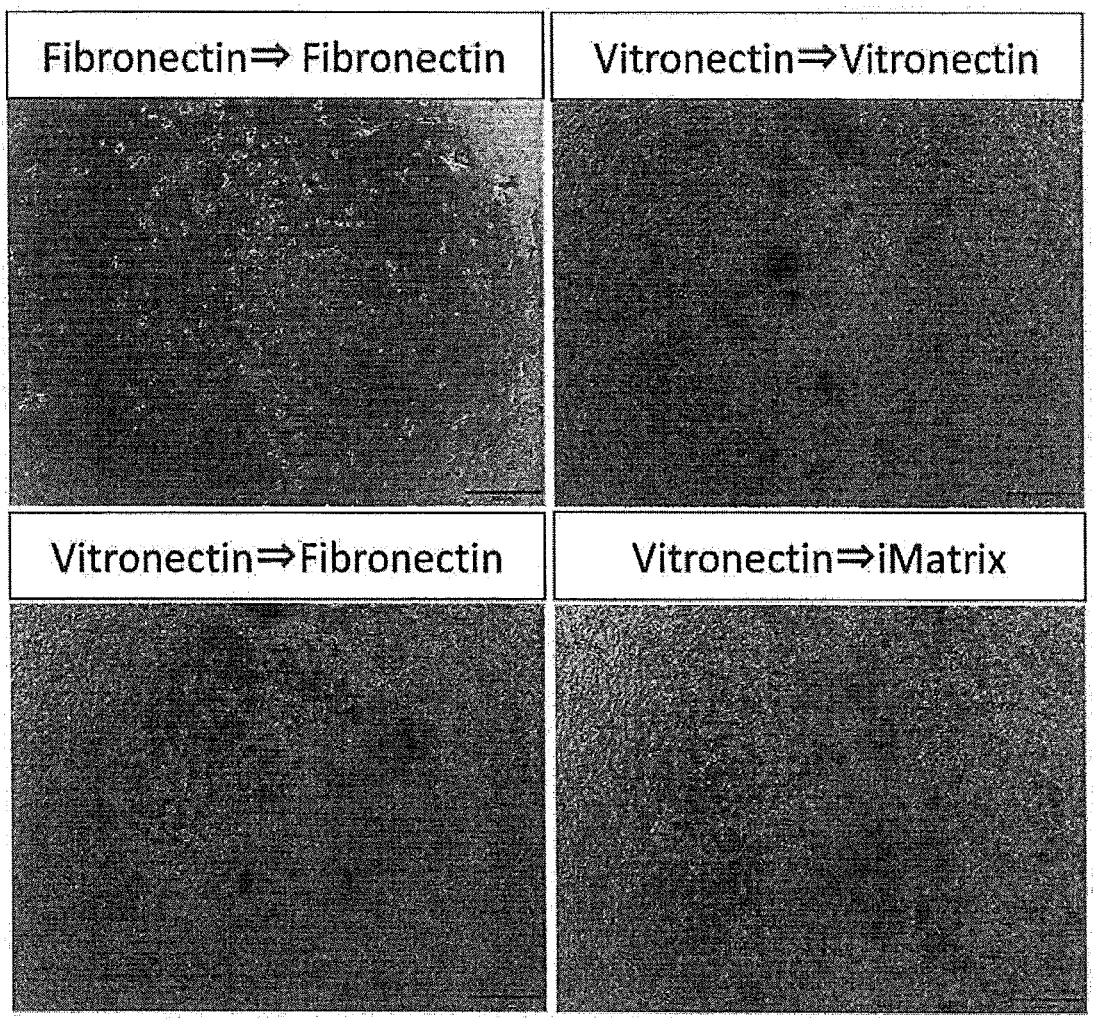
FIG. 3 shows photographs of cells 13 days after MNC seeding.

After confirming that the cells became sub-confluent, the cells were passaged on day 13 after seeding, and the number of cells was measured. FIG. 2 shows the measurement results of the cell number. In addition, FIG. 3 shows photographs of the cells. It was found that the difference in the extracellular matrix for coating the culture container in re-seeding does not affect the number of cells obtained.

From the above results, it was found that the number of cell aggregates obtained and the number of cells obtained by the subsequent re-seeding were larger when a culture container coated with Vitronectin was used at the time of seeding of the cells than when a culture container coated with Fibronectin was used.

Furthermore, the cells detached from the plate coated with Vitronectin were expansion cultured, and surface antigen analysis was performed. Using FACS, surface antigen analysis of 3 kinds of MSC positive markers (CD105, CD90, CD73) and 2 kinds of MSC negative markers (CD45, CD34) was performed. Table 1 shows the analysis results. It could be confirmed that the obtained cells were positive for CD105, CD90, CD73, negative for CD45, CD34, and were MSCs.

TABLE 1

| | | MSC isolated with serum-free medium + Vitronectin | general MSC |
|---|---|---|---|
| MSC markers | CD105 | + | + |
| | CD90 | + | + |
| | CD73 | + | + |
| blood cell markers | CD34 | − | − |
| | CD45 | − | − |

Example 2: Study of Difference in MSC Production Promoting Effect by the Kind of Vitronectin MNC (Lonza) was thawed using the following medium for seeding (serum-free). The above-mentioned cells were seeded at a concentration of $2.6 \times 10^6$ cells/well in 24-well plates coated with Vitronectin (20-398 aa) (wako) (corresponding to amino acid Nos. 1-379 of SEQ ID NO: 1), Vitronectin (VTN-N, 62-478 aa) (Life Technologies) (corresponding to amino acid Nos. 43-459 of SEQ ID NO: 1) or Vitronectin (Full length, 20-478 aa) (Sigma) (corresponding to SEQ ID NO: 1) at a concentration of 1.5 µg/cm$^2$, and cultured under the conditions of 37° C., 5% $CO_2$. In addition, the cells were seeded at a concentration of 1.6×10⁶ cells/well in a 24-well plate coated with Vitronectin (20-398 aa) (wako) or Synthemax II (CORNING) at concentrations of 1.5 µg/cm² and 5.0 µg/cm², respectively, and cultured under the conditions of 37° C., 5% $CO_2$. Synthemax II is a vitronectin-based synthetic peptide containing RGD motif and flanking sequence. The next day of seeding, the entire amount of the medium in the plate was replaced with a medium for seeding, and the medium for seeding in an amount corresponding to 20% of the amount of the medium in the plate was further added on day 3 and day 5 after seeding.

Medium for seeding: StemFit (registered trade mark) AKO3N medium (Ajinomoto Co., Inc.) SOLUTION A, ¼ StemFit (registered trade mark) AKO3N medium (Ajinomoto Co., Inc.) SOLUTION B, 3 ng/mL bFGF (peprotech), 10 µM SB431542 (Stemgent), 1/100 Lipid Concentrate (Life Technologies), 10 nM Dexamethasone (Sigma-Aldrich), 10 ng/mL PDGF-BB (FUJIFILM Wako Pure Chemical Industries, Ltd.), 1 mM Lithium Chloride (Sigma-Aldrich)

Aggregates were collected day 7 after seeding and the cells were re-seeded using the following medium for proliferation. Specifically, after collecting the culture supernatant, DPBS (Nacalai Tesque) was added to the plate, and the aggregates were detached from the plate by pipetting, and all aggregates were collected together with DPBS. Thereafter, the collected culture supernatant and DPBS were combined and centrifuged, and only the aggregates were collected. The aggregates were dissociated into single cells by resuspending the collected aggregates in the proliferation medium. the entire amount of the collected cells was seeded in a 24-well plate, and cultured under the conditions of 37° C., 5% $CO_2$. Thereafter, the entire amount of the medium in the plate was replaced with the medium for proliferation every 2-3 days until the cells became sub-confluent.

Medium for proliferation: StemFit (registered trade mark) AKO3N medium (Ajinomoto Co., Inc.) SOLUTION A, ¼ StemFit (registered trade mark) AKO3N medium (Ajinomoto Co., Inc.) SOLUTION B, StemFit (registered trade mark) AKO3N medium (Ajinomoto Co., Inc.) SOLUTION C, 1/100 Lipid Concentrate (Life Technologies), 10 nM Dexamethasone (Sigma-Aldrich), 10 ng/mL PDGF-BB (FUJIFILM Wako Pure Chemical Industries, Ltd.), 1 mM Lithium Chloride (Sigma-Aldrich), 0.2 µg/mL iMatrix 511 (Nippi, Inc.)

Figure 4:
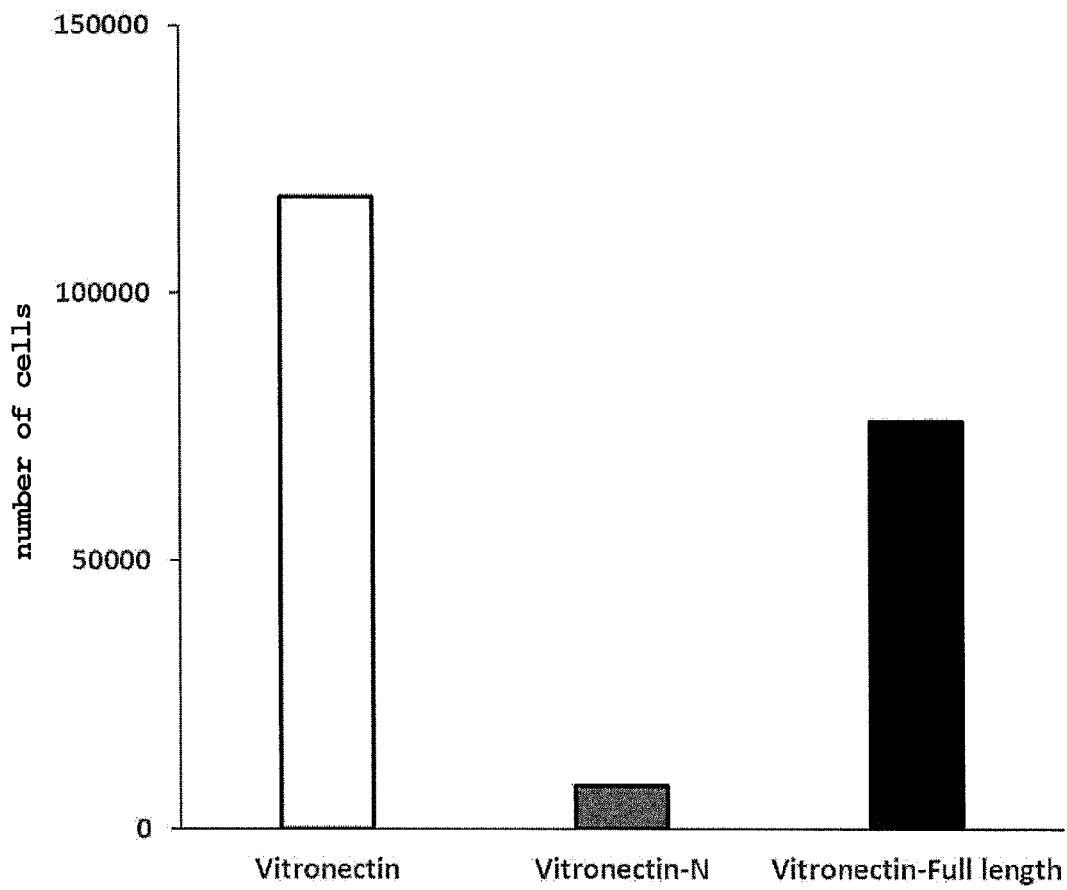
FIG. 4 shows the measurement results of the number of MSC 13 days after MNC seeding when different Vitronectin was used.
Figure 5:
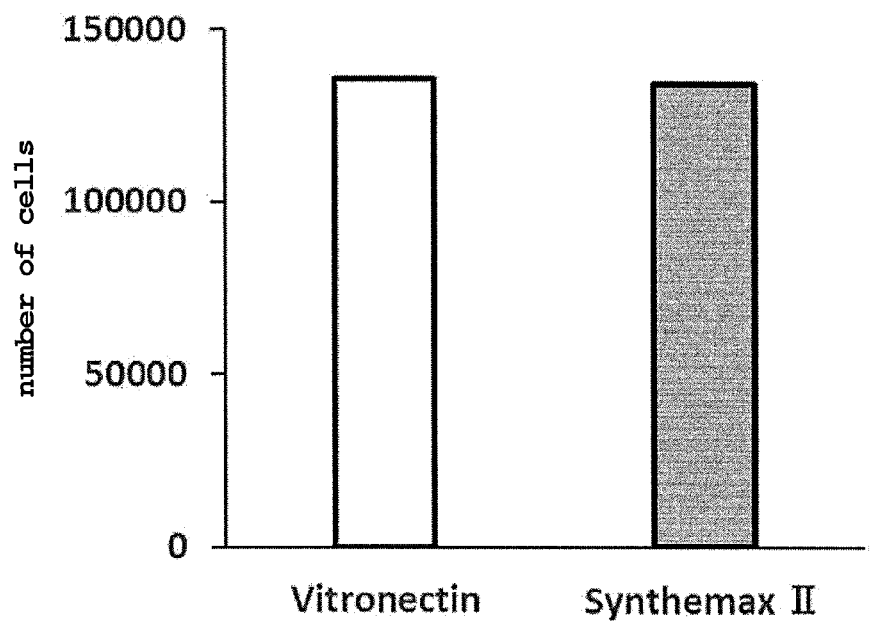
FIG. 5 shows the measurement results of the number of MSC 12 days after MNC seeding when different Vitronectin was used.

After confirming that the cells became sub-confluent, the cells were passaged on days 12 and 13 after seeding, and the number of cells was measured. FIG. 4 shows the measurement results of the cell number when Vitronectin (20-398 aa) (wako), Vitronectin (VTN-N, 62-478aa) (Life Technologies) or Vitronectin (Full length, 20-478 aa) (Sigma) were used. While MSC could be produced using any vitronectin when seeding MNC, Vitronectin (20-398 aa) (wako) could produce MSC most efficiently from MNC. FIG. 5 shows the measurement results of the cell number when Vitronectin (20-398 aa) (wako) or Synthemax II (CORNING) were used. MSC could be efficiently produced from MNC even when Synthemax II (CORNING) was used when seeding MNC.

Example 3: Study of MSC Production Promoting Effect by TGFβ Receptor Inhibitor

MNC (Lonza) was thawed using the following medium for seeding (1) or (2). The above-mentioned cells were seeded at a concentration of 2.6×10⁶ cells/well in a 24-well plate coated with Vitronectin (VTN-N, 62-478 aa) (Life Technologies) at a concentration of 1.5 µg/cm², and cultured under the conditions of 37° C., 5% $CO_2$. The next day of seeding, the entire amount of the medium in the plate was replaced with a medium for seeding (1) or (2), and the medium for seeding in an amount corresponding to 20% of the amount of the medium (1) or (2) in the plate was further added on day 3 and day 5 after seeding. Medium for seeding (1) (TGFβ inhibitor (−)): StemFit (registered trade mark) AKO3N medium (Ajinomoto Co., Inc.) SOLUTION A, StemFit (registered trade mark) AKO3N medium (Ajinomoto Co., Inc.) SOLUTION B, 3 ng/mL bFGF (peprotech), 1/100 Lipid Concentrate (Life Technologies), 10 nM Dexamethasone (Sigma-Aldrich), 10 ng/mL PDGF-BB (FUJIFILM Wako Pure Chemical Industries, Ltd.), 1 mM Lithium Chloride (Sigma-Aldrich)

Medium for seeding (2) (TGFβ inhibitor (+)): StemFit (registered trade mark) AKO3N medium (Ajinomoto Co., Inc.) SOLUTION A, StemFit (registered trade mark) AKO3N medium (Ajinomoto Co., Inc.) SOLUTION B, 3 ng/mL bFGF (peprotech), 10 µM SB431542 (Stemgent), 1/100 Lipid Concentrate (Life Technologies), 10 nM Dexamethasone (Sigma-Aldrich), 10 ng/mL PDGF-BB (FUJIFILM Wako Pure Chemical Industries, Ltd.), 1 mM Lithium Chloride (Sigma-Aldrich)

Aggregates were collected day 7 after seeding and the cells were re-seeded using the following medium for proliferation. Specifically, after collecting the culture supernatant, DPBS (Nacalai Tesque) was added to the plate, and the aggregates were detached from the plate by pipetting, and all aggregates were collected together with DPBS. Thereafter, the collected culture supernatant was combined and centrifuged, and only the aggregates were collected. The aggregates were dissociated into single cells by resuspending the collected aggregates in the proliferation medium. The entire amount of the collected cells was seeded in a 24-well plate, and cultured under the conditions of 37° C., 5% $CO_2$. Thereafter, the entire amount of the medium in the plate was replaced with the medium for proliferation every 2-3 days until the cells became sub-confluent.

Medium for proliferation: StemFit (registered trade mark) AKO3N medium (Ajinomoto Co., Inc.) SOLUTION A, ¼ StemFit (registered trade mark) AKO3N medium (Ajinomoto Co., Inc.) SOLUTION B, StemFit (registered trade mark) AKO3N medium (Ajinomoto Co., Inc.) SOLUTION C, 1/100 Lipid Concentrate (Life Technologies), 10 nM Dexamethasone (Sigma-Aldrich), 10 ng/mL PDGF-BB (FUJIFILM Wako Pure Chemical Industries, Ltd.), 1 mM Lithium Chloride (Sigma-Aldrich), 0.2 µg/mL iMatrix 511 (Nippi, Inc.)

Figure 6:
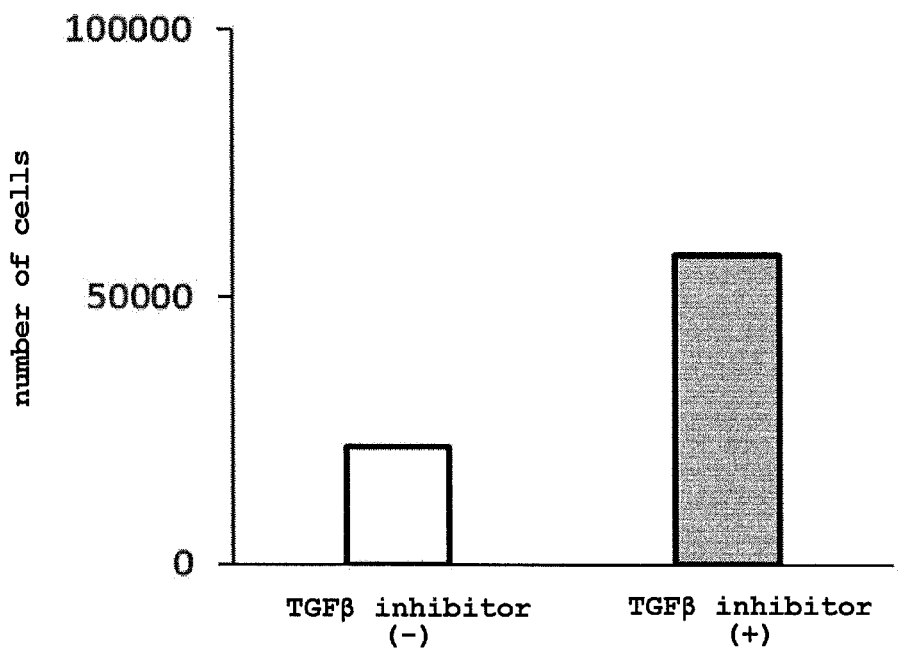
FIG. 6 shows the measurement results of the number of MSC 15 days after MNC seeding when a TGFβ inhibitor was used.

After confirming that the cells became sub-confluent, the cells were passaged on day 15 after seeding, and the number of cells was measured. FIG. 6 shows the measurement results of the cell number. MSC could be efficiently produced from MNC when the medium for seeding contained a TGF inhibitor at the time of seeding MNC.

Example 4: Study of Difference in MSC Production Promoting Effect by the Kind of TGFβ Receptor Inhibitor MNC (Lonza) was thawed using the following medium for seeding (1), (2) or (3). The above-mentioned cells were seeded at a concentration of 2.6×10⁶ cells/well in a 24-well plate coated with Vitronectin (20-398 aa) (wako) at a concentration of 1.5 µg/cm², and cultured under the conditions of 37° C., 5% $CO_2$. The next day of seeding, the entire amount of the medium in the plate was replaced with a medium for seeding (1), (2) or (3), and the medium for seeding (1), (2) or (3) in an amount corresponding to 20% of the amount of the medium in the plate was further added on day 3 and day 5 after seeding. Medium for seeding (1): StemFit (registered trade mark) AKO3N medium (Ajinomoto Co., Inc.) SOLUTION A, ¼ StemFit (registered trade mark) AKO3N medium (Ajinomoto Co., Inc.) SOLUTION B, 3 ng/mL bFGF (peprotech), 10 µM SB431542 (Stemgent), 1/100 Lipid Concentrate (Life Technologies), 10 nM Dexamethasone (Sigma-Aldrich), 10 ng/mL PDGF-BB (FUJIFILM Wako Pure Chemical Industries, Ltd.), 1 mM Lithium Chloride (Sigma-Aldrich)

Medium for seeding (2): StemFit (registered trade mark) AKO3N medium (Ajinomoto Co., Inc.) SOLUTION A, ¼ StemFit (registered trade mark) AKO3N medium (Ajinomoto Co., Inc.) SOLUTION B, 3 ng/mL bFGF (peprotech), 0.5 µM A-83-01 (wako), 1/100 Lipid Concentrate (Life Technologies), 10 nM Dexamethasone (Sigma-Aldrich), 10 ng/mL PDGF-BB (FUJIFILM Wako Pure Chemical Industries, Ltd.), 1 mM Lithium Chloride (Sigma-Aldrich)

Medium for seeding (3): StemFit (registered trade mark) AKO3N medium (Ajinomoto Co., Inc.) SOLUTION A, ¼ StemFit (registered trade mark) AKO3N medium (Ajinomoto Co., Inc.) SOLUTION B, 3 ng/mL bFGF (peprotech), 0.5 µM LDN-193189 (Stemgent), 1/100 Lipid Concentrate (Life Technologies), 10 nM Dexamethasone (Sigma-Aldrich), 10 ng/mL PDGF-BB (FUJIFILM Wako Pure Chemical Industries, Ltd.), 1 mM Lithium Chloride (Sigma-Aldrich)

Aggregates were collected day 7 after seeding and the cells were re-seeded using the following medium for proliferation. Specifically, after collecting the culture supernatant, DPBS (Nacalai Tesque) was added to the plate, and the aggregates were detached from the plate by pipetting, and all aggregates were collected together with DPBS. Thereafter, the collected culture supernatant and DPBS were combined and centrifuged, and only the aggregates were collected. The aggregates were dissociated into single cells by resuspending the collected aggregates in the proliferation medium. the entire amount of the collected cells was seeded in a 24-well plate, and cultured under the conditions of 37° C., 5% $CO_2$. Thereafter, the entire amount of the medium in the plate was replaced with the medium for proliferation every 2-3 days until the cells became sub-confluent.

Medium for proliferation: StemFit (registered trade mark) AKO3N medium (Ajinomoto Co., Inc.) SOLUTION A, ¼ StemFit (registered trade mark) AKO3N medium (Ajinomoto Co., Inc.) SOLUTION B, StemFit (registered trade mark) AKO3N medium (Ajinomoto Co., Inc.) SOLUTION C, 1/100 Lipid Concentrate (Life Technologies), 10 nM Dexamethasone (Sigma-Aldrich), 10 ng/mL PDGF-BB (FUJIFILM Wako Pure Chemical Industries, Ltd.), 1 mM Lithium Chloride (Sigma-Aldrich), 0.2 µg/mL iMatrix 511 (Nippi, Inc.)

Figure 7:
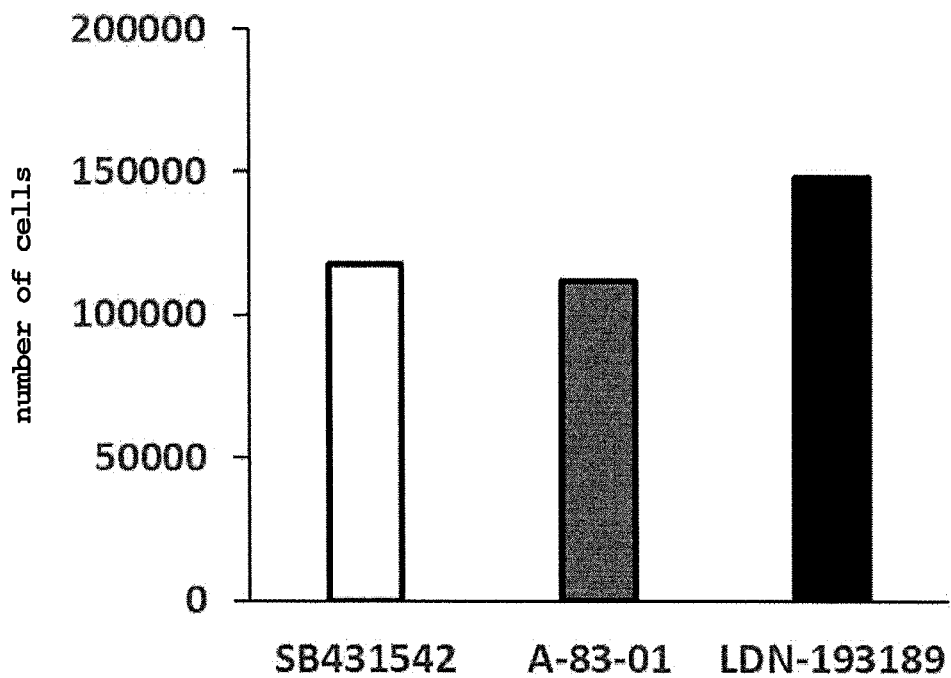
FIG. 7 shows the measurement results of the number of MSC 12 days after MNC seeding when a different TGFβ receptor inhibitor was used.

After confirming that the cells became sub-confluent, the cells were passaged on day 12 after seeding, and the number of cells was measured. FIG. 7 shows the measurement results of the cell number. MSC could be efficiently produced from MNC by using any of TGFβ receptor inhibitors SB431542 (ALK5 inhibition), A-83-01 (ALK4, ALK5, ALK7 inhibition) and LDN-193189 (ALK2, ALK3 inhibition).

Example 5: Study of MSC Production from Adipose Tissue

Adipose tissue surrounding epididymis collected from C57BL/6J mice (11-week-old, male) was treated with collagenase, and cells were obtained using the following medium for seeding (1) or (2). The above-mentioned cells were seeded at a concentration of $6.0 \times 10^4$ cells/well in a 24-well plate, and cultured under the conditions of 37° C., 5% $CO_2$. A 24-well plate coated with Vitronectin (VTN-N, 62-478 aa) (Life Technologies) at a concentration of 1.5 µg/cm² was used for the cells seeded in medium for seeding (1). The next day of seeding and day 2 after seeding, the entire amount of the medium in the plate was replaced with medium for seeding (1) or (2).

Medium for seeding (1): StemFit (registered trade mark) AKO3N medium (Ajinomoto Co., Inc.) SOLUTION A, ¼ StemFit (registered trade mark) AKO3N medium (Ajinomoto Co., Inc.) SOLUTION B, 3 ng/mL bFGF (peprotech), 10 µM SB431542 (Stemgent), 1/100 Lipid Concentrate (Life Technologies), 10 nM Dexamethasone (Sigma-Aldrich), 10 ng/mL PDGF-BB (FUJIFILM Wako Pure Chemical Industries, Ltd.), 1 mM Lithium Chloride (Sigma-Aldrich)

Medium for seeding (2): DMEM medium (sigma), 10% fetal calf serum (Life Technologies)

Figure 8:
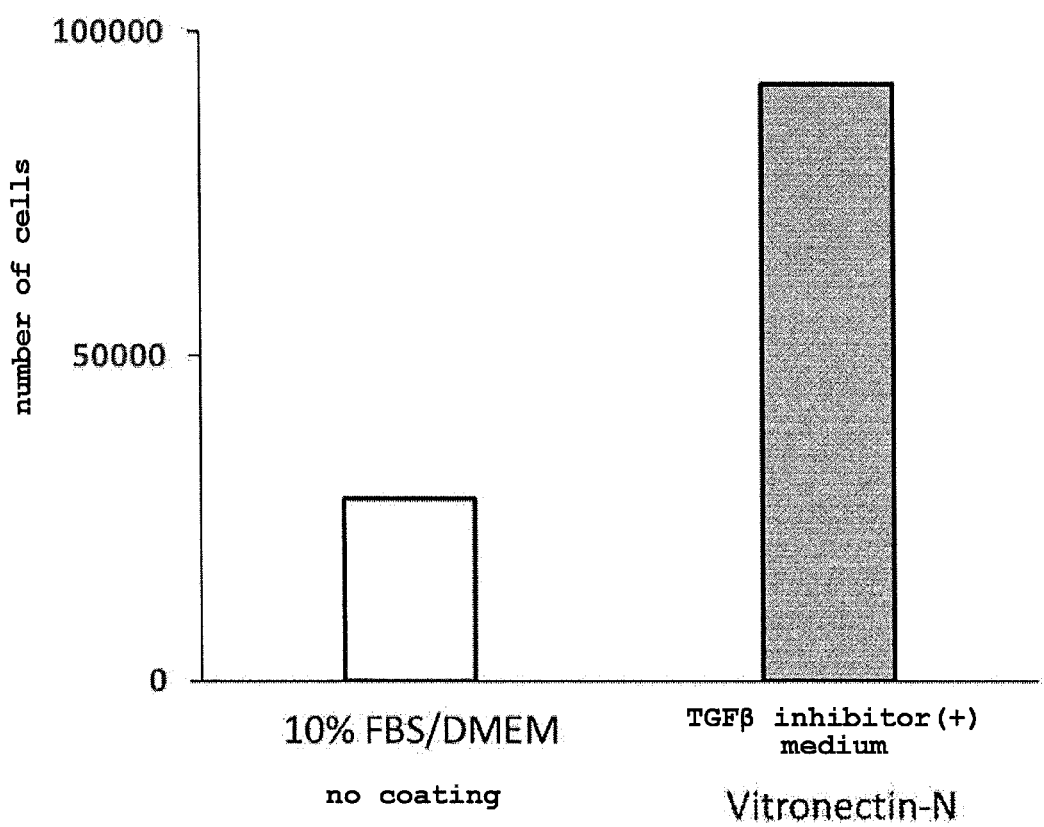
FIG. 8 shows the measurement results of the number of cells isolated from mouse adipose tissue and at 5 days after seeding.
Figure 9:
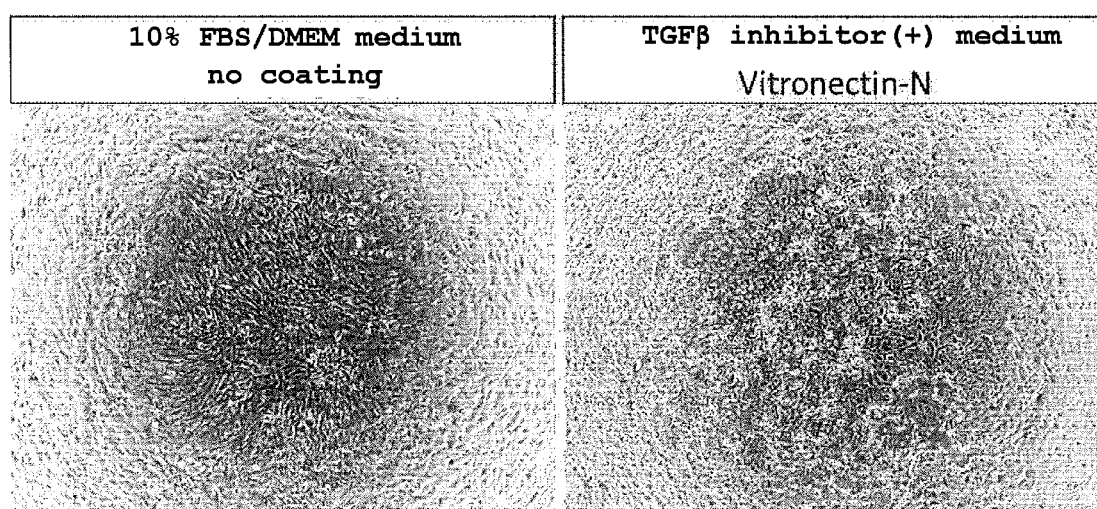
FIG. 9 shows photographs of cells isolated from mouse adipose tissue and at 5 days after seeding.

After confirming that the cells became sub-confluent, the cells were passaged on day 5 after seeding, and the number of cells was measured. FIG. 8 shows the measurement results of the cell number. FIG. 9 shows photographs of the cells. MSC could be efficiently produced from adipose tissue by using a medium containing a TGF receptor inhibitor and vitronectin.

INDUSTRIAL APPLICABILITY

Mesenchymal stem cells can be efficiently produced from a biological cell sample by culturing the biological cell sample containing mesenchymal stem cells in a serum-free medium or a xeno-free medium in the presence of vitronectin or a partial peptide thereof capable of adhering mesenchymal stem cells. By adopting this method, the obtained mesenchymal stem cells can be directly used as a cell source in regenerative medicine.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A method for producing a mesenchymal stem cell from a biological cell sample comprising mesenchymal stem cells, the method comprising:
    (1) culturing the biological cell sample comprising mesenchymal stem cells in a serum-free medium in the presence of vitronectin or a partial peptide thereof capable of adhering mesenchymal stem cells,
    (2) collecting a cell aggregate of the mesenchymal stem cells,
    (3) dissociating the collected cell aggregate,
    (4) culturing the dissociated mesenchymal stem cells in a serum-free medium in the presence of an extracellular matrix protein or a partial peptide thereof capable of adhering mesenchymal stem cells, and
    (5) collecting the mesenchymal stem cells proliferated on the culture container via the extracellular matrix protein or a partial peptide thereof capable of adhering mesenchymal stem cells.

2. The method according to claim 1, wherein the culturing in the presence of the extracellular matrix protein or a partial peptide thereof capable of adhering mesenchymal stem cells is performed by culturing on a culture container on which the extracellular matrix protein or a partial peptide thereof capable of adhering mesenchymal stem cells has been immobilized.

3. The method according to claim 1, wherein the partial peptide of vitronectin comprises an RGD domain.

4. The method according to claim 3, wherein the partial peptide of vitronectin further comprises a somatomedin B domain.

5. The method according to claim 4, wherein the partial peptide of vitronectin consists of the amino acids Nos. 1-379 of the amino acid sequence of SEQ ID NO: 1.

6. The method according to claim 1, wherein the serum-free medium in (1) comprises a TGF-β receptor inhibitor.

7. The method according to claim 1, wherein the biological cell sample comprising mesenchymal stem cells is a bone marrow-derived cell.

8. The method according to claim 7, wherein the number of the cells derived from bone marrow and to be cultured is from $0.5 \times 10^5$ to $25 \times 10^5$ cells/cm$^2$.

9. The method according to claim 7, wherein the cells derived from bone marrow are cultured for a period of from 4 days to 14 days.

10. The method according to claim 1, wherein the biological cell sample comprising mesenchymal stem cells is a cell derived from adipose tissue.

11. The method according to claim 10, wherein the number of the cells derived from adipose tissue and to be cultured is $1 \times 10^3$ to $1 \times 10^6$ cells/cm$^2$.

12. The method according to claim 10, wherein the cells derived from adipose tissue are cultured for a period of 1 day to 14 days.

13. The method according to claim 1, wherein the culture in the presence of vitronectin or a partial peptide thereof capable of adhering mesenchymal stem cells is performed by culturing on a culture container on which vitronectin or the partial peptide thereof capable of adhering mesenchymal stem cells has been immobilized.

14. A method for producing a mesenchymal stem cell from a biological cell sample comprising mesenchymal stem cells, the method comprising:
    (1) culturing the biological cell sample comprising mesenchymal stem cells in a xeno-free medium in the presence of vitronectin or a partial peptide thereof capable of adhering mesenchymal stem cells,
    (2) collecting a cell aggregate of the mesenchymal stem cells,
    (3) dissociating the collected cell aggregate,
    (4) culturing the dissociated mesenchymal stem cells in a xeno-free medium in the presence of an extracellular matrix protein or a partial peptide thereof capable of adhering mesenchymal stem cells, and
    (5) collecting the mesenchymal stem cells proliferated on the culture container via the extracellular matrix protein or a partial peptide thereof capable of adhering mesenchymal stem cells.

15. The method according to claim 14, wherein the culture in the presence of the extracellular matrix protein or a partial peptide thereof capable of adhering mesenchymal stem cells is performed by culturing on a culture container on which the extracellular matrix protein or a partial peptide thereof capable of adhering mesenchymal stem cells has been immobilized.

16. The method according to claim 14, wherein the partial peptide of vitronectin comprises an RGD domain.

17. The method according to claim 16, wherein the partial peptide of vitronectin further comprises a somatomedin B domain.

18. The method according to claim 17, wherein the partial peptide of vitronectin is a polypeptide consisting of amino acid Nos. 1-379 of the amino acid sequence shown in SEQ ID NO: 1.

19. The method according to claim 14, wherein the xeno-free medium in step (1) comprises a TGF-β receptor inhibitor.

20. The method according to claim 14, wherein the xeno-free medium comprises an allogeneic serum.

21. The method according to claim 20, wherein the allogeneic serum is an autologous serum.

* * * * *

SEQUENCE LISTING

<160> NUMBER OF SEQ ID NOS: 1

<210> SEQ ID NO 1

```
<211> LENGTH: 459
<212> TYPE: PRT
<213> ORGANISM: Homo sapiens

<400> SEQUENCE: 1

Asp Gln Glu Ser Cys Lys Gly Arg Cys Thr Glu Gly Phe Asn Val Asp
1               5                   10                  15

Lys Lys Cys Gln Cys Asp Glu Leu Cys Ser Tyr Tyr Gln Ser Cys Cys
            20                  25                  30

Thr Asp Tyr Thr Ala Glu Cys Lys Pro Gln Val Thr Arg Gly Asp Val
        35                  40                  45

Phe Thr Met Pro Glu Asp Glu Tyr Thr Val Tyr Asp Asp Gly Glu Glu
    50                  55                  60

Lys Asn Asn Ala Thr Val His Glu Gln Val Gly Gly Pro Ser Leu Thr
65                  70                  75                  80

Ser Asp Leu Gln Ala Gln Ser Lys Gly Asn Pro Glu Gln Thr Pro Val
                85                  90                  95

Leu Lys Pro Glu Glu Ala Pro Ala Pro Glu Val Gly Ala Ser Lys
            100                 105                 110

Pro Glu Gly Ile Asp Ser Arg Pro Glu Thr Leu His Pro Gly Arg Pro
            115                 120                 125

Gln Pro Pro Ala Glu Glu Leu Cys Ser Gly Lys Pro Phe Asp Ala
130                 135                 140

Phe Thr Asp Leu Lys Asn Gly Ser Leu Phe Ala Phe Arg Gly Gln Tyr
145                 150                 155                 160

Cys Tyr Glu Leu Asp Glu Lys Ala Val Arg Pro Gly Tyr Pro Lys Leu
                165                 170                 175

Ile Arg Asp Val Trp Gly Ile Glu Gly Pro Ile Asp Ala Ala Phe Thr
            180                 185                 190

Arg Ile Asn Cys Gln Gly Lys Thr Tyr Leu Phe Lys Gly Ser Gln Tyr
        195                 200                 205

Trp Arg Phe Glu Asp Gly Val Leu Asp Pro Asp Tyr Pro Arg Asn Ile
    210                 215                 220

Ser Asp Gly Phe Asp Gly Ile Pro Asp Asn Val Asp Ala Ala Leu Ala
225                 230                 235                 240

Leu Pro Ala His Ser Tyr Ser Gly Arg Glu Arg Val Tyr Phe Phe Lys
                245                 250                 255

Gly Lys Gln Tyr Trp Glu Tyr Gln Phe Gln His Gln Pro Ser Gln Glu
            260                 265                 270

Glu Cys Glu Gly Ser Ser Leu Ser Ala Val Phe Glu His Phe Ala Met
        275                 280                 285

Met Gln Arg Asp Ser Trp Glu Asp Ile Phe Glu Leu Leu Phe Trp Gly
    290                 295                 300

Arg Thr Ser Ala Gly Thr Arg Gln Pro Gln Phe Ile Ser Arg Asp Trp
305                 310                 315                 320

His Gly Val Pro Gly Gln Val Asp Ala Ala Met Ala Gly Arg Ile Tyr
                325                 330                 335

Ile Ser Gly Met Ala Pro Arg Pro Ser Leu Ala Lys Lys Gln Arg Phe
            340                 345                 350

Arg His Arg Asn Arg Lys Gly Tyr Arg Ser Gln Arg Gly His Ser Arg
        355                 360                 365

Gly Arg Asn Gln Asn Ser Arg Arg Pro Ser Arg Ala Thr Trp Leu Ser
    370                 375                 380

Leu Phe Ser Ser Glu Glu Ser Asn Leu Gly Ala Asn Asn Tyr Asp Asp
```

-continued

```
            385                 390                 395                 400

Tyr Arg Met Asp Trp Leu Val Pro Ala Thr Cys Glu Pro Ile Gln Ser
            405                 410                 415

Val Phe Phe Phe Ser Gly Asp Lys Tyr Tyr Arg Val Asn Leu Arg Thr
            420                 425                 430

Arg Arg Val Asp Thr Val Asp Pro Pro Tyr Pro Arg Ser Ile Ala Gln
            435                 440                 445

Tyr Trp Leu Gly Cys Pro Ala Pro Gly His Leu
    450                 455
```